UNITED STATES PATENT OFFICE.

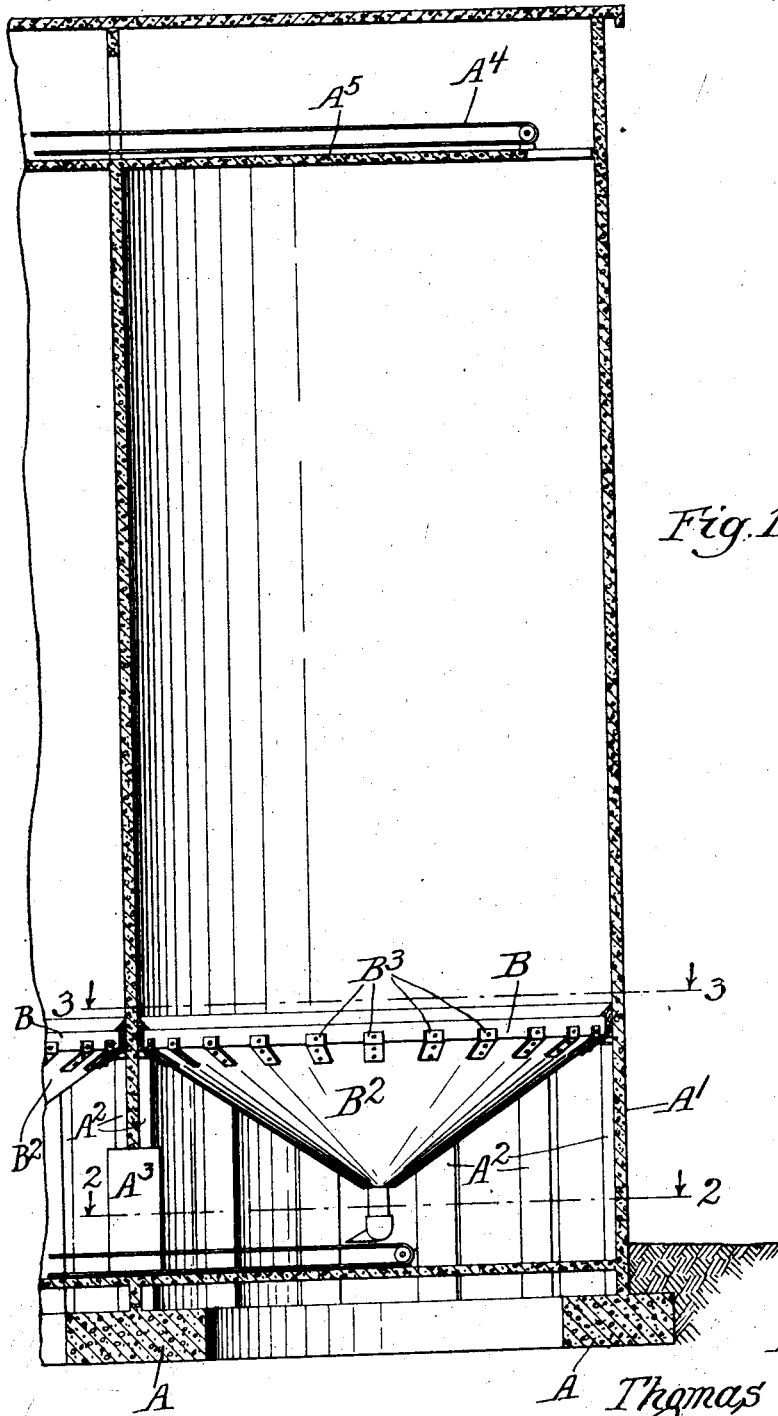

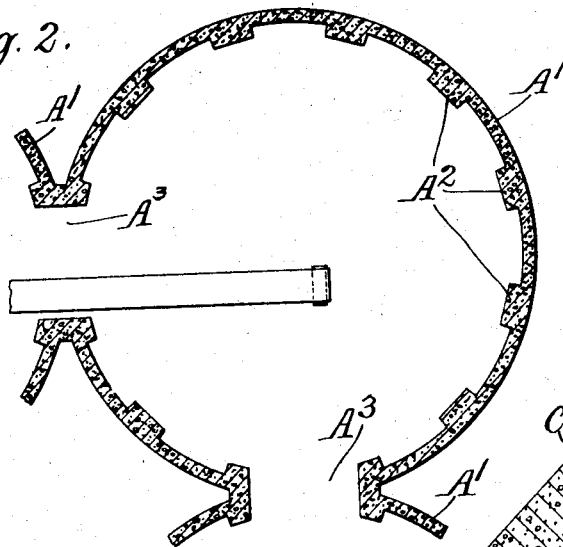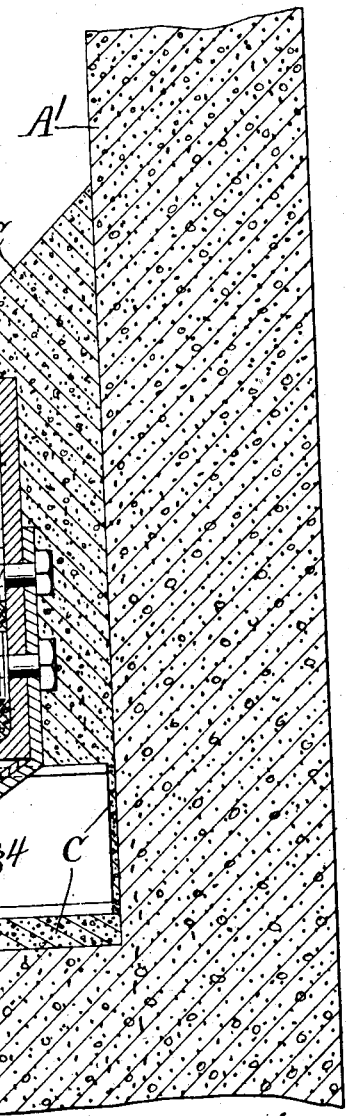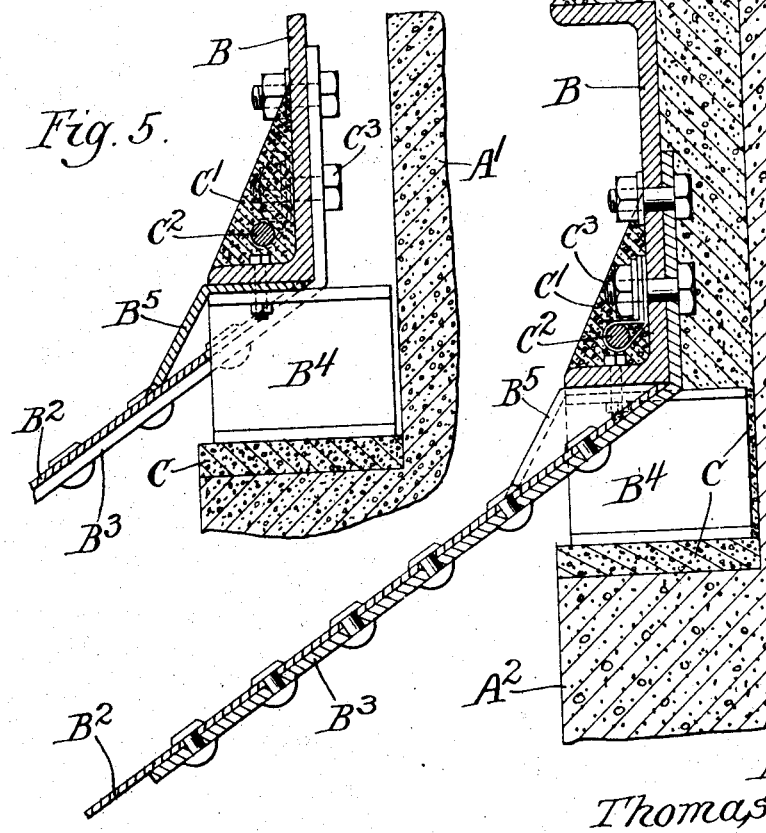

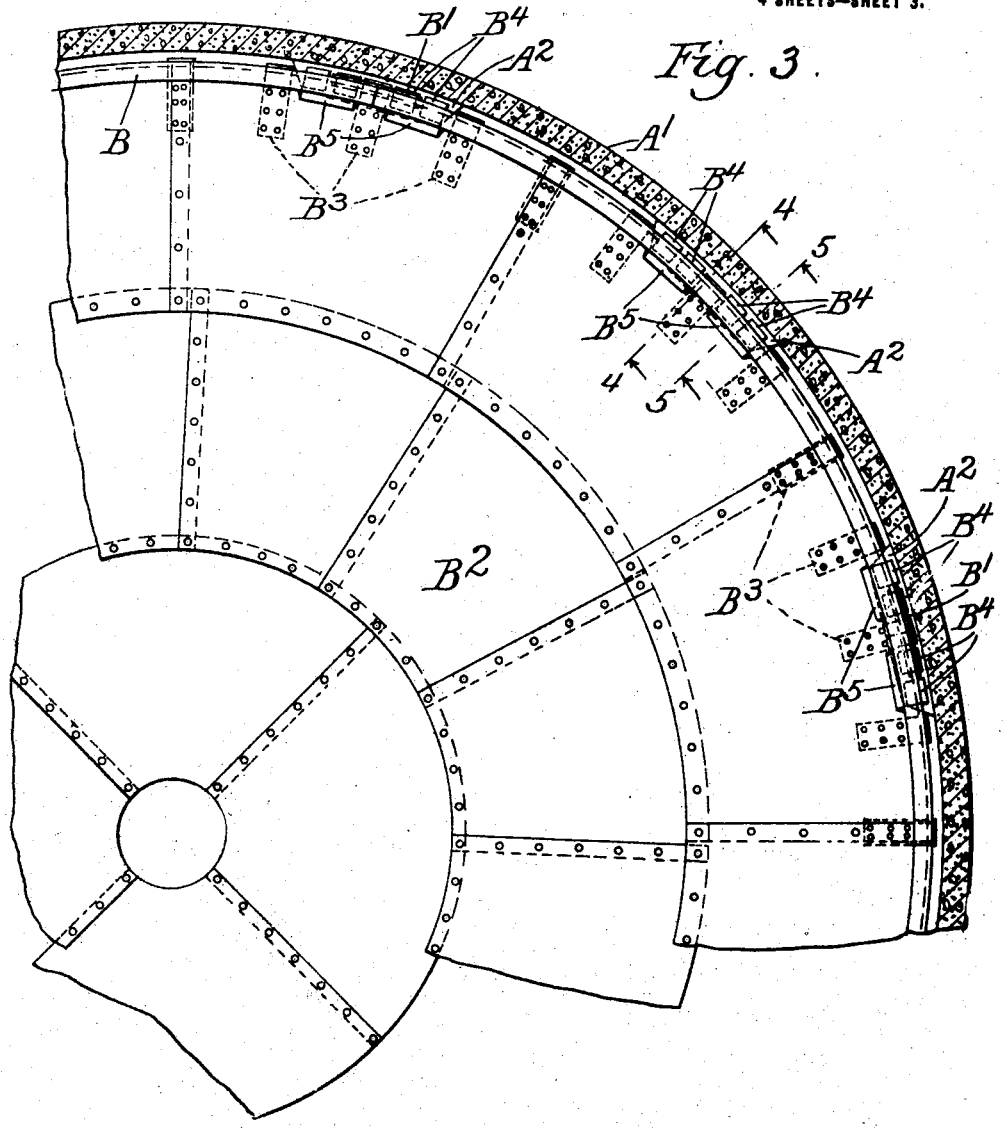

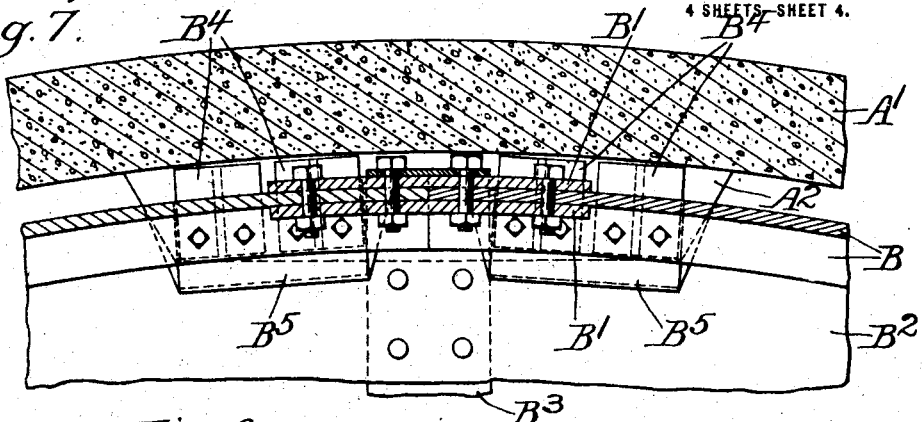
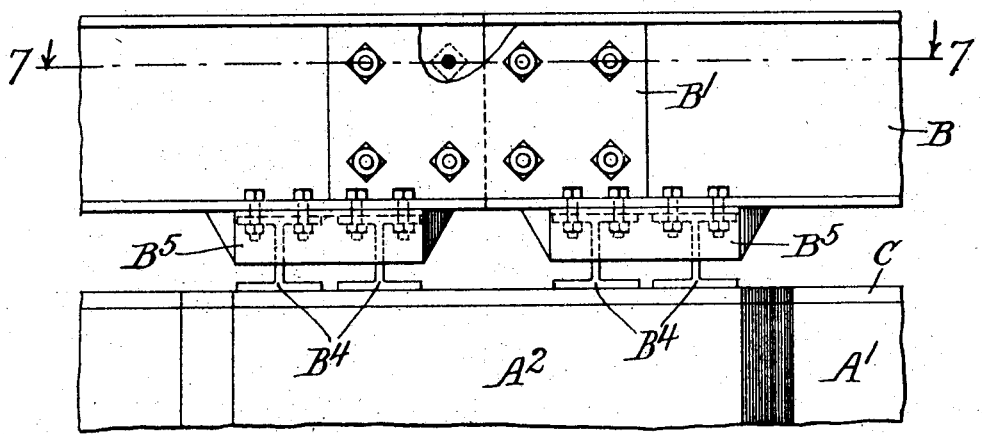
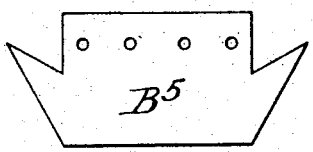

THOMAS D. BUDD, OF CHICAGO, ILLINOIS.

GRAIN-ELEVATOR.

1,391,297. Specification of Letters Patent. Patented Sept. 20, 1921.

Application filed April 12, 1920. Serial No. 373,058.

*To all whom it may concern:*

Be it known that I, THOMAS D. BUDD, a citizen of the United States, residing at Chicago, in the county of Cook and State of Illinois, have invented a certain new and useful Improvement in Grain-Elevators, of which the following is a specification.

My invention relates to grain elevators and the process of erecting the same and has for one object to provide a new and improved form of bin bottom for grain storage bins, which will be easy, cheap and convenient to install, which will be fire proof, rigid and durable, which will require a decreased amount of material, and which will give approximately 5% greater capacity without an increase of the total height of the bin.

Another object of my invention is to carry the total load directly to the foundation instead of carrying the load indirectly through an arrangement providing for cross bending and compression. Other objects of my invention will appear from time to time in the specification.

My invention is illustrated more or less diagrammatically in the accompanying drawings wherein:

Figure 1 is a sectional view of an elevator showing my grain bin with parts in elevation;

Fig. 2 is a section along the line 2 2 of Fig. 1;

Fig. 3 is a section along the line 3 3 of Fig. 1 on an enlarged scale, with the grouting omitted;

Fig. 4 is a section along the line 4 4 of Fig. 3;

Fig. 5 is a section along the line 5 5 of Fig. 3;

Fig. 6 is a detail of a portion of the annular channel frame;

Fig. 7 is a section along the line 7 7 of Fig. 6;

Fig. 8 shows the development of the apron protecting the supporting shoes.

Like parts are indicated by like characters throughout the drawings.

A A are the foundation members buried in the ground in the usual manner. Extending upwardly from them is the annular bin or hopper wall A'. This wall is reinforced as indicated in Fig. 2 by means of pillars or pilasters $A^2$ $A^2$ integral with the wall on the inner periphery thereof and all of them terminating in a horizontal plane spaced above the ground level. My bin as indicated, is preferably a part of separate bins or structures though it might stand alone. In any event there are doorways $A^3$ through the wall at the bottom to permit access to the working zone beneath the bin. The annular bin wall is carried up to the top of the structure and there carries the normal working machinery such as the belt $A^4$ on the upper floor $A^5$.

B is an annular channel ring or frame bent to conform substantially to the inner diameter of the bin and its ends joined by the fish plate B' bolted or riveted in place as indicated. The outer diameter of this ring is sufficiently less than the inner diameter of the bin to provide clearance. $B^2$ is a reversed conical hopper or bin bottom supported on the annular frame by means of a series of hangers or brackets $B^3$ $B^3$ spaced about its periphery and bolted or riveted in place to the bin floor or hopper. This floor or hopper is cut away in line with each of the dutchmen to provide space for the chairs $B^4$. These chairs are I beams and rest on the dutchmen and support the channel frame. The cut away portions of the hopper bottom are closed by aprons $B^5$ bolted or riveted in position to prevent escape of the grain.

C C indicate grouting material of cement poured in behind the annular frame to fill the space between it and the wall of the bin and having its upper surface downwardly inclined or tapered toward the inner edge of the upper flange of the frame so that there will be no place for grain to settle. C' C' is similar grouting or filling material provided with the reinforcing rod $C^2$ wired to the bolt $C^3$ so as to reinforce and stiffen the lower portion of the annular channel frame, but more primarily to provide an inner surface whereby there is no possibility of the grain settling and remaining on the channel.

The use and operation of my invention are as follows:

The grain bin and there may be one or more, is erected in the usual manner by the use of moving forms, the only difference between them and the ordinary forms being that the forms are cut away or adjustable on the inside so that the wall of the bin for a few feet above the foundations may be stiffened or increased in thickness by the provision of a plurality of spaced pilasters which all are terminated at the same height above the ground at an elevation determined by the hopper bottom. After which the forms will be manipulated in the usual manner to carry the bins up to the proper height.

After the forms have progressed above the tops of these pilasters, an annular circle or compression member of preferably channel section will be erected inside the bin upon or immediately above the tops of these pilasters and this compression member will form the rim of the conical metallic hopper bottom which will be suspended by and attached to the lower portion of this compression member.

The hopper bottom will be cut away immediately adjacent the compression member above each of the pilasters so that supporting shoes may be interposed between the bottom of the compression member and the top of the pilaster and a shield will be built around such cut away portion to prevent leakage of grain around the places where the bin bottom is cut away to provide a place for the shoes.

The space between the compression member and the wall of the bin will be filled with a cement grout and will be smoothed off to provide an inclined floor so that there will be no possibility of grain lodging on any of the opposed surfaces on the inside of the bin.

The grain is drawn out of the hopper in the usual manner, being handled by the machinery which I have indicated diagrammatically beneath the bin.

In a certain respect, grain in a tank has been considered as a fluid, but for the purpose of my invention, it is the granular characteristic of the grain which is important. That is to say, in a grain hopper, it is an established fact that the pressure exerted by the weight of the grain on the hopper bottom is limited by the relation between the diameter of the tank and its depth, and it is an established fact that the hopper bottom has to support a weight of grain to a height equal to the diameter of the tank plus the weight of the grain in the hopper, and therefore, by the arrangement which I have proposed, the peripheral support of the hopper on the reinforced wall pilasters together with the support by the wall itself of that grain located in the upper portion of the tank results in the total weight of the grain being directly applied to the bin foundations through the bin walls only, acting in compression only, thus explaining the absence of need of any beams or bending members except as noted, to transmit the load to the foundations, and no part of the concrete bin structure carries anything except the compression load. However, the annular ring carries both a compression and a bending load and the hopper plates carry a load in tension, but all these various loads are resolved in the hopper bottom itself into a direct compression load thus the hopper itself is self-contained and merely rests on the concrete supports.

I claim:

1. A receptacle for grain or other granular material, having a relatively thin vertically disposed wall, a separate downwardly funneled hopper bottom, means associated with the wall and engaging the hopper bottom only at its periphery for suspending it within the receptacle, a peripheral reinforcing member surrounding and rigidly attached to the periphery of the hopper bottom and in engagement with the hopper bottom supporting means.

2. A receptacle for grain or other granular material, having a relatively thin vertically disposed wall, a separate downwardly funneled hopper bottom, means associated with the wall and engaging the hopper bottom only at its periphery for suspending it within the receptacle, a hopper bottom supporting means comprising a plurality of reinforcing columns located within the receptacle, and so arranged that they may engage the hopper bottom at its periphery.

3. A receptacle for grain or other granular material, having a relatively thin vertically disposed wall, a separate downwardly funneled hopper bottom, means associated with the wall and engaging the hopper bottom only at its periphery for suspending it within the receptacle, the hopper bottom being reinforced at its periphery where it is suspended, the hopper bottom supporting means comprising a plurality of reinforcing columns located within the receptacle and so arranged that they may engage the hopper bottom at its periphery.

4. A receptacle for grain or other granular material, having a relatively thin vertically disposed wall, a separate downwardly funneled hopper bottom, means associated with the wall and engaging the hopper bottom only at its periphery for suspending it within the receptacle, a peripheral reinforcing member surrounding and rigidly attached to the periphery of the hopper bottom and in engagement with the hopper bottom supporting means, the hopper bottom supporting means comprising a plurality of reinforcing columns located within the receptacle and so arranged that they may engage the hopper bottom at its periphery.

5. A receptacle for grain or other granular material, having a relatively thin vertically disposed wall, a separate downwardly funneled hopper bottom, means associated with the wall and engaging the hopper bottom only at its periphery for suspending it within the receptacle, a hopper bottom supporting means comprising a plurality of reinforcing columns located within the receptacle, and so arranged that they may engage the hopper bottom at its periphery, said columns being integral with the wall.

6. A receptacle for grain or other granular material, having a relatively thin vertically disposed wall, a separate downwardly funneled hopper bottom, means associated with the hopper bottom and engaging the hopper bottom only at its periphery for suspending it within the receptacle, the hopper bottom being reinforced at its periphery where it is suspended, the hopper bottom supporting means comprising a plurality of reinforcing columns located within the receptacle and so arranged that they may engage the hopper bottom at its periphery, said columns being integral with the wall.

7. A receptacle for grain or other granular material, having a relatively thin vertically disposed wall, a separate downwardly funneled hopper bottom, means associated with the hopper bottom and engaging the hopper bottom only at its periphery for suspending it within the receptacle, a peripheral reinforcing member surrounding and rigidly attached to the periphery of the hopper bottom and in engagement with the hopper bottom supporting means, the hopper bottom supporting means comprising a plurality of reinforcing columns located within the receptacle and so arranged that they may engage the hopper bottom at its periphery, said columns being integral with the wall.

8. A grain bin comprising an annular concrete wall, interior integral reinforcing columns terminating below the top of the wall, an annular compression and bending member resting on said columns, a conical hopper bottom in tension supported at its periphery by such compression and bending member.

9. A grain bin comprising an annular concrete wall, interior integral reinforcing columns terminating below the top of the wall, an annular compression and bending member resting on said columns, a conical hopper bottom in tension supported at its periphery by such compression member, means for closing the interstices between the hopper bottom and the wall of the bin.

10. In a grain elevator, a cylindrical concrete grain tank having a relatively thin wall, the wall at its base on the inner side being thickened by a series of spaced integral columns, an annular compression and bending ring member located within the wall resting on said columns, and a hopper bottom suspended on and rigidly attached to said compression member.

11. A receptacle for granular materials having a relatively thin vertically disposed wall, a separate downwardly funneled hopper bottom, means associated with the wall and engaging the hopper bottom only at its periphery for suspending it within the receptacle, hopper bottom supporting means comprising a plurality of projections about the inner periphery of the wall, adapted to engage the hopper bottom about its periphery.

12. A receptacle for finely divided materials, having a vertically disposed wall, a downwardly funneled hopper bottom, foundations adapted to support said wall and bottom, and means associated with said bottom adapted to direct the weight supported by said bottom directly downwardly upon said foundations.

13. A receptacle for finely divided materials, having a vertically disposed wall, a downwardly funneled hopper bottom, foundations adapted to support said wall and bottom, and means associated with said bottom, comprising a peripheral compression member about said hopper bottom, adapted to direct the weight supported by said bottom directly downwardly upon said foundations.

14. A receptacle for finely divided materials, having a vertically disposed wall, a downwardly funneled hopper bottom, foundations adapted to support said walls and hopper bottom, members upwardly extending from said foundation within said walls, adapted to support said hopper bottom, and means associated with said hopper bottom adapted to direct the entire weight supported by said bottom directly downwardly upon said members.

15. A receptacle for finely divided materials, having a vertically disposed wall, a downwardly funneled hopper bottom, foundations adapted to support said walls and hopper bottom, members upwardly extending from said foundation within said walls, adapted to support said hopper bottom, and means associated with said hopper bottom, comprising a peripheral compression member about said hopper bottom, adapted to direct the entire weight supported by said bottom directly downwardly upon said members.

16. A receptacle for finely divided materials, having a vertically disposed wall, a downwardly funneled hopper bottom, foundations adapted to support said walls and hopper bottom, members upwardly extending from said foundation within said walls, adapted to support said hopper bottom, and means associated with said hopper bottom adapted to direct the entire weight supported by said bottom directly downwardly upon said members, comprising a peripheral reinforcing member about said hopper bottom, in engagement with said supporting members.

Signed at Chicago, county of Cook and State of Illinois, this 7 day of April, 1920.

THOMAS D. BUDD.